(12) United States Patent
Zhang

(10) Patent No.: US 10,960,279 B2
(45) Date of Patent: Mar. 30, 2021

(54) GOLF BAG FIXING DEVICE FOR GOLF CART

(71) Applicant: NINGBO WENTAI SPORT EQUIPMENT CO., LTD., Zhejiang (CN)

(72) Inventor: Sheng Zhang, Zhejiang (CN)

(73) Assignee: NINGBO WENTAI SPORT EQUIPMENT CO., LTD., Zhejiang (CN)

( * ) Notice: Subject to any disclaimer, the term of this patent is extended or adjusted under 35 U.S.C. 154(b) by 3 days.

(21) Appl. No.: 16/462,244

(22) PCT Filed: Jan. 16, 2018

(86) PCT No.: PCT/CN2018/000017
§ 371 (c)(1),
(2) Date: May 20, 2019

(87) PCT Pub. No.: WO2018/184412
PCT Pub. Date: Oct. 11, 2018

(65) Prior Publication Data
US 2020/0269102 A1 Aug. 27, 2020

(30) Foreign Application Priority Data
Apr. 5, 2017 (CN) .......................... 201720350198.5

(51) Int. Cl.
*A63B 55/50* (2015.01)
*F16M 13/02* (2006.01)
*F16B 2/10* (2006.01)

(52) U.S. Cl.
CPC ................ *A63B 55/50* (2015.10); *F16B 2/10* (2013.01); *F16M 13/02* (2013.01); *A63B 2210/50* (2013.01)

(58) Field of Classification Search
CPC ..... A63B 55/50; A63B 2210/50; F16B 21/10; F16M 13/02; B62B 2202/404
(Continued)

(56) References Cited

U.S. PATENT DOCUMENTS 2,496,478 A * 2/1950 Kinnebrew ........... A61J 9/0661
248/103
5,465,930 A 11/1995 Wu
(Continued)

FOREIGN PATENT DOCUMENTS

| CN | 2320291 | 5/1999 |
| CN | 2453978 | 10/2001 |

(Continued)

OTHER PUBLICATIONS

"International Search Report (Form PCT/ISA/210)", dated Apr. 16, 2018, with English translation thereof, pp. 1-6.

*Primary Examiner* — Anita M King
(74) *Attorney, Agent, or Firm* — JCIP Global Inc.

(57) ABSTRACT

The invention discloses a golf bag fixing device for a golf cart. The golf bag fixing device for a golf cart includes a base and two fixing assemblies, wherein the two fixing assemblies are arranged at the left end and the right end of the base, each fixing assembly includes a clamping arm and a fixing buckle, the clamping arms are rotatably arranged on the base and are connected with the fixing buckles, a clamping space is formed between the base and the clamping arms of the two fixing assemblies, the clamping arms can be stressed to overcome an acting force from the fixing buckles so as to rotate relative to the base, and the fixing buckles can be stressed to be separated from the clamping arms.

12 Claims, 5 Drawing Sheets

(58) Field of Classification Search
USPC .......................................................... 248/96
See application file for complete search history.

(56) References Cited

U.S. PATENT DOCUMENTS

| | | | | |
|---|---|---|---|---|
| 5,718,401 | A * | 2/1998 | Walters | A01K 97/10 |
| | | | | 248/150 |
| 6,364,327 | B1 * | 4/2002 | Liao | B62B 1/042 |
| | | | | 280/40 |
| 6,513,816 | B1 * | 2/2003 | Kijima | B62B 5/0083 |
| | | | | 280/47.26 |
| 6,918,604 | B2 * | 7/2005 | Liao | A63B 55/60 |
| | | | | 280/47.26 |
| 7,597,224 | B2 * | 10/2009 | Jacobs | A63B 55/10 |
| | | | | 211/70.2 |
| 2003/0047651 | A1 * | 3/2003 | Liao | A63B 55/60 |
| | | | | 248/96 |

FOREIGN PATENT DOCUMENTS

| | | |
|---|---|---|
| CN | 200948337 | 9/2007 |
| CN | 201304221 | 9/2009 |
| CN | 206660509 | 11/2017 |
| DE | 10344077 | 4/2005 |

* cited by examiner

GOLF BAG FIXING DEVICE FOR GOLF CART

CROSS-REFERENCE TO RELATED APPLICATION

This application is a 371 application of an international PCT application serial no. PCT/CN2018/000017, filed on Jan. 16, 2018, which claims priority to and the benefit of China Patent Application No. CN201720350198.5, filed on Apr. 5, 2017. The entirety of each of the above-mentioned patent applications is hereby incorporated by reference herein and made a part of this specification.

BACKGROUND OF THE INVENTION

1. Technical Field

The invention relates to a golf bag fixing device, in particular to a golf bag fixing device for a golf cart.

2. Description of Related Art

Up to now, the sport of golf has a history of several hundred years since its foundation, and golf bags, as important tools for carrying golf balls and golf clubs in golf sports, have been widely used. At present, the golf bags are generally transported by adopting golf carts. A conventional golf bag fixing device for a golf cart generally includes a base and two fixing assemblies arranged at the left end and the right end of the base, wherein the base is fixedly mounted on the frame of the golf cart, and each fixing assembly includes binding strips (generally elastic strings or fabric strips) arranged on the base. When transported, the golf bags are placed on the base and are then fixed by tying the binding strips of the two fixing assemblies together; and the golf bags can be taken down only if the binding strips are untied. However, due to the fact that the conventional golf bag fixing device for a golf cart has a complex operation process and the binding strips are usually hung on other objects, inconvenience is caused to users.

BRIEF SUMMARY OF THE INVENTION

The technical issue to be settled by the invention is to provide a golf bag fixing device which is applied to a golf cart and is simple in operation process and convenient to use.

The technical scheme adopted by the invention to settle the above technical issue is as follows: the golf bag fixing device for a golf cart includes a base and two fixing assemblies, wherein the two fixing assemblies are arranged at the left end and the right end of the base; each fixing assembly includes a clamping arm and a fixing buckle; the clamping arms are rotatably arranged on the base and are connected with the fixing buckles, and a clamping space is formed between the base and the clamping arms of the two fixing assemblies; the clamping arms can be stressed to overcome an acting force from the fixing buckles so as to rotate relative to the base; and the fixing buckles can be stressed to be separated from the clamping arms.

Each fixing assembly also includes a first elastic mechanism and a second elastic mechanism; the clamping arms are connected with the base through the first elastic mechanisms; the fixing buckles are rotatably arranged on the base; and one ends of the fixing buckles are connected with the base through the second elastic mechanisms. According to this structure, the restoration of the clamping arms is realized through the first elastic mechanisms, and the restoration of the fixing buckles is realized through the second elastic mechanisms, so that the golf bag fixing device is more convenient to use.

The clamping arms are mounted on the base through first hinge pins; each first elastic mechanism includes a first spring; the first springs are arranged on the first hinge pins in a sleeving manner; and one ends of the first springs are connected with the clamping arms, and the other ends of the first springs are connected with the base. This structure is easy to mount and low in cost.

The fixing buckles are mounted on the base through second hinge pins; each second elastic mechanism includes a second spring; one ends of the second springs are connected with one ends of the fixing buckles, and the other ends of the second springs are connected with the base. This structure is easy to mount and low in cost.

First tooth ripples are formed on the clamping arms, a mounting cavity is formed in the base, the fixing buckles are located in the mounting cavity, second tooth ripples are formed at the other ends of the fixing buckles, the first tooth ripples are engaged with the second tooth ripples, and the first tooth ripples are able to unidirectionally rotate relative to the second tooth ripples. In this structure, the clamping arms and the fixing buckles are connected through the cooperation of the first tooth ripples and the second tooth ripples, and therefore, the clamping arms can smoothly rotate when stressed and can stably connected with the fixing buckles when not stressed.

Each fixing assembly also includes a soft cushion; the soft cushions are arranged on clamping surfaces of the clamping arms. In this structure, the soft cushions make contact with a golf bag, so that the golf bag is prevented from rotating or being separated in a transportation process; and meanwhile, the golf bag can be protected, and the fixing stability and the durability of the golf bag can be improved.

Compared with the prior art, the invention has the following advantages: the fixing assemblies are formed by the clamping arms and the fixing buckles, the clamping arms are rotatably arranged on the base and are connected with the fixing buckles, the clamping space is formed between the base and the clamping arms of the two fixing assemblies, and the clamping arms can be stressed to overcome the acting force from the fixing buckles so as to rotate relative to the base; therefore, when transported, the golf bag is placed into the clamping space formed between the base and the clamping arms of the two fixing assemblies, the clamping arms of the two fixing assemblies are rotated close to each other to clamp and fix the golf bag; when the golf bag needs to be used, the fixing buckles are stressed to be separated from the clamping arms, so that the clamping arms are released, the golf bag is unclamped by the clamping arms, and the golf bag is no longer fixed by the two fixing assemblies and can be taken out to be used; and the operational process is simple, usage is convenient, and when not used, the clamping arms of the two fixing assemblies can be folded to reduce the size, and thus, storage is facilitated.

DETAILED DESCRIPTION OF THE INVENTION

The invention is further detailed as follows in combination with the drawings and embodiments.

Figure 1:
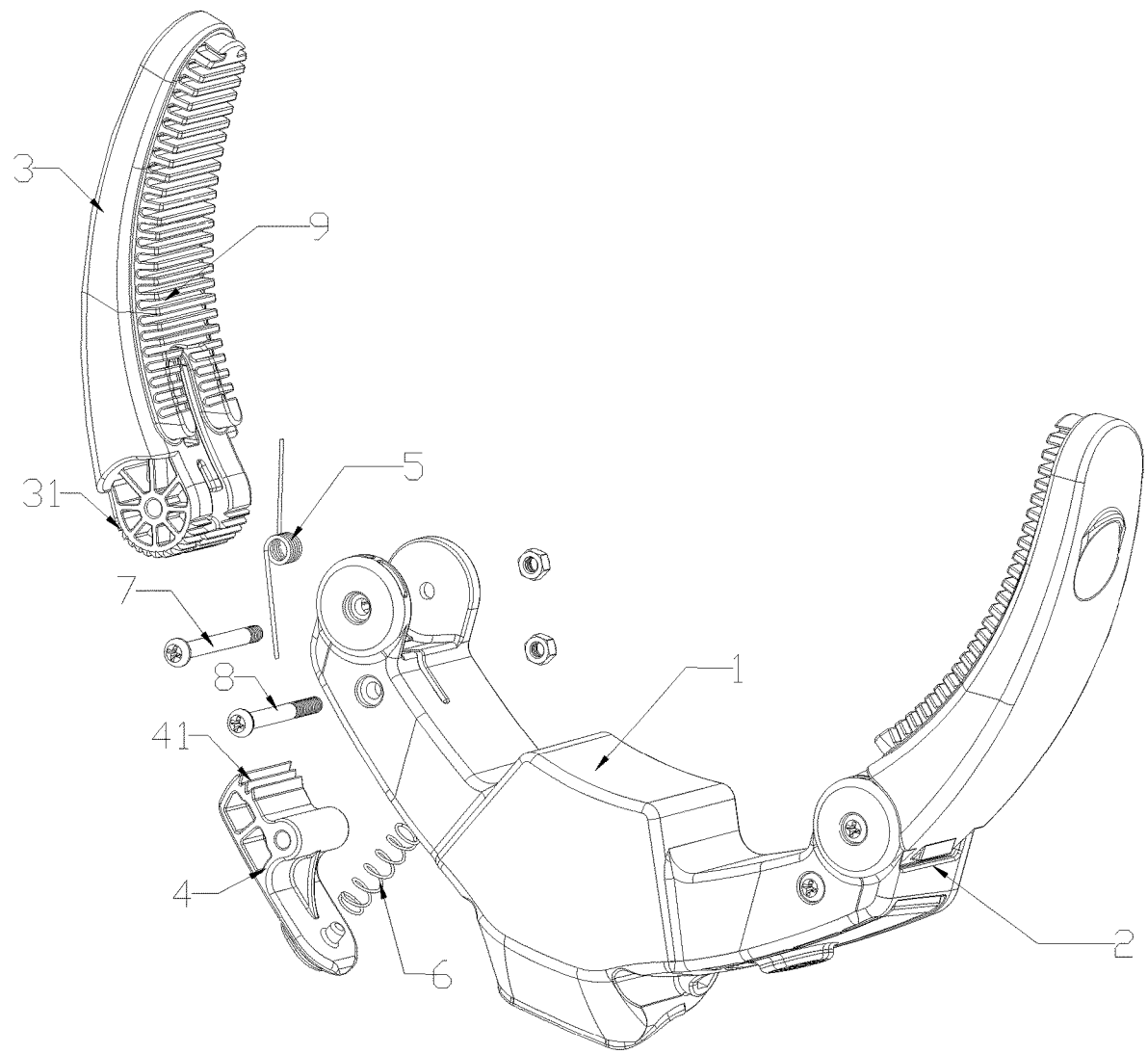
FIG. 1 is a partial exploded view of a golf bag fixing device for a golf cart of the invention.
Figure 2:
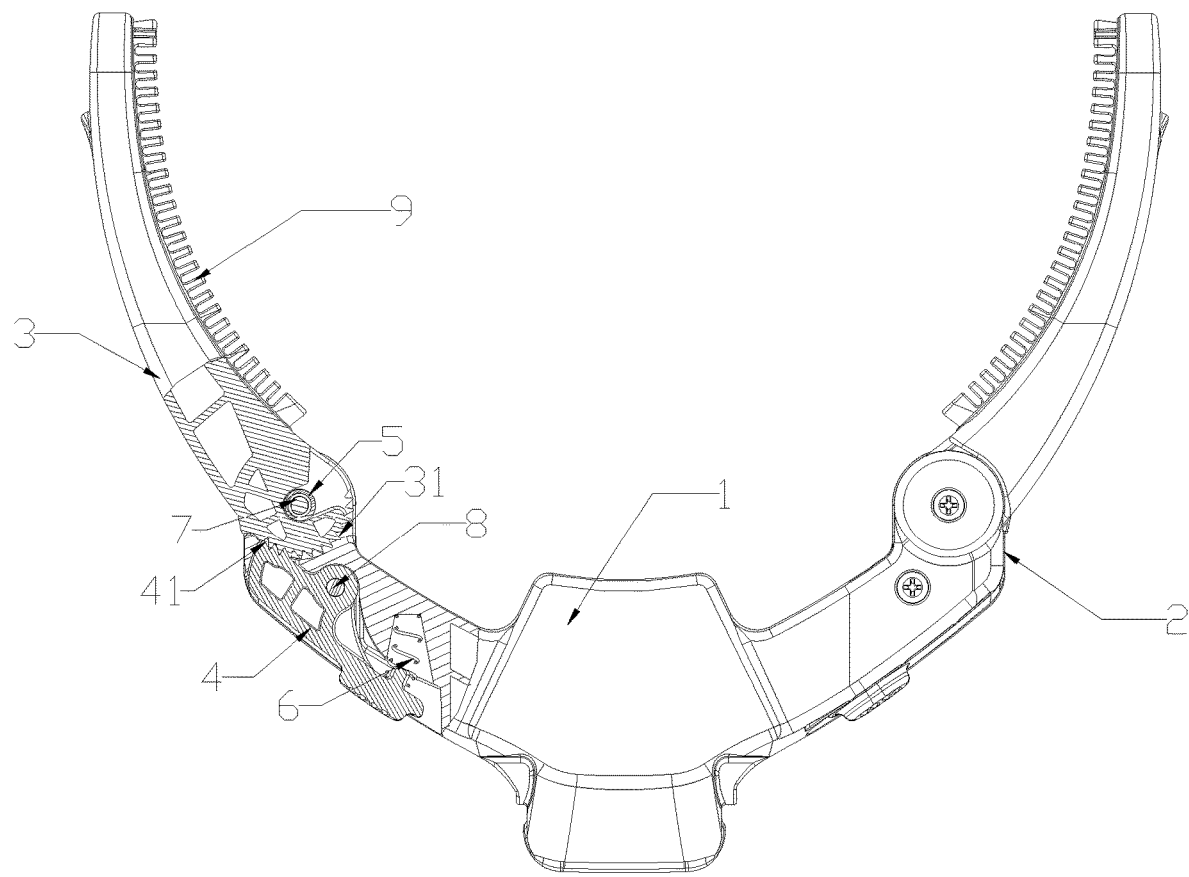
FIG. 2 is a partial sectional view of the golf bag fixing device, in an unfolded state, for a golf cart of the invention.

First Embodiment 1 as shown in FIG. 1 and FIG. 2, the golf bag fixing device for a golf cart includes a base 1 and two fixing assemblies 2, wherein the two fixing assemblies 2 are arranged at the left end and the right end of the base 1; each fixing assembly 2 includes a clamping arm 3 and a fixing buckle 4; the clamping arms 3 are rotatably arranged on the base 1 and are connected with the fixing buckles 4, and a clamping space is formed between the base 1 and the clamping arms 3 of the two fixing assemblies 2; the clamping arms 3 can be stressed to overcome an acting force from the fixing buckles 4 to rotate relative to the base 1; and the fixing buckles 4 can be stressed to be separated from the clamping arms 3.

Second Embodiment as shown in FIG. 1 and FIG. 2, the golf bag fixing device for a golf cart includes a base 1 and two fixing assemblies 2, wherein the two fixing assemblies 2 are arranged at the left end and the right end of the base 1; each fixing assembly 2 includes a clamping arm 3 and a fixing buckle 4; and the clamping arms 3 are rotatably arranged on the base 1 and are connected with the fixing buckles 4, and a clamping space is formed between the base 1 and the clamping arms 3 of the two fixing assemblies 2; the clamping arms 3 can be stressed to overcome an acting force from the fixing buckles 4 to rotate relative to the base 1; and the fixing buckles 4 can be stressed to be separated from the clamping arms 3.

In this embodiment, each fixing assembly 2 also includes a first elastic mechanism 5 and a second elastic mechanism 6; the clamping arms 3 are connected with the base 1 through the first elastic mechanisms 5; and the fixing buckles 4 are rotatably arranged on the base 1, and one ends of the fixing buckles 4 are connected with the base 1 through the second elastic mechanisms 6.

In this embodiment, the clamping arms 3 are mounted on the base 1 through first hinge pins 7; each first elastic mechanism 5 includes a first spring; the first springs are arranged on the first hinge pins 7 in a sleeving manner; and one ends of the first springs are connected with the clamping arms 3, and the other ends of the first springs are connected with the base 1.

In this embodiment, the fixing buckles 4 are mounted on the base 1 through second hinge pins 8; each second elastic mechanism 6 includes a second spring; one ends of the second springs are connected with one ends of the fixing buckles 4, and the other ends of the second springs are connected with the base 1.

In this embodiment, first tooth ripples 31 are formed on the clamping arms 3, a mounting cavity is formed in the base 1, the fixing buckles 4 are located in the mounting cavity, the second tooth ripples 41 are formed at the other ends of the fixing buckles 4, the first tooth ripples 31 are engaged with the second tooth ripples 41, and the first tooth ripples 31 are able to unidirectionally rotate relative to the second tooth ripples 41.

Third Embodiment as shown in FIG. 1 and FIG. 2, the golf bag fixing device for a golf cart includes a base 1 and two fixing assemblies 2, wherein the two fixing assemblies 2 are arranged at the left end and the right end of the base 1; each fixing assembly 2 includes a clamping arm 3 and a fixing buckle 4; and the clamping arms 3 are rotatably arranged on the base 1 and are connected with the fixing buckles 4, and a clamping space is formed between the base 1 and the clamping arms 3 of the two fixing assemblies 2; the clamping arms 3 can be stressed to overcome an acting force from the fixing buckles 4 to rotate relative to the base 1; and the fixing buckles 4 can be stressed to be separated from the clamping arms 3.

In this embodiment, each fixing assembly 2 also includes a first elastic mechanism 5 and a second elastic mechanism 6; the clamping arms 3 are connected with the base 1 through the first elastic mechanisms 5; and the fixing buckles 4 are rotatably arranged on the base 1, and one ends of the fixing buckles 4 are connected with the base 1 through the second elastic mechanisms 6.

In this embodiment, the clamping arms 3 are mounted on the base 1 through first hinge pins 7; each first elastic mechanism 5 includes a first spring; the first springs are arranged on the first hinge pins 7 in a sleeving manner; and one ends of the first springs are connected with the clamping arms 3, and the other ends of the first springs are connected with the base 1.

In this embodiment, the fixing buckles 4 are mounted on the base 1 through second hinge pins 8; each second elastic mechanism 6 includes a second spring; one ends of the second springs are connected with one ends of the fixing buckles 4, and the other ends of the second springs are connected with the base 1.

In this embodiment, first tooth ripples 31 are formed on the clamping arms 3, a mounting cavity is formed in the base 1, the fixing buckles 4 are located in the mounting cavity, the second tooth ripples 41 are formed at the other ends of the fixing buckles 4, the first tooth ripples 31 are engaged with the second tooth ripples 41, and the first tooth ripples 31 are able to unidirectionally rotate relative to the second tooth ripples 41.

In this embodiment, each fixing assembly 2 also includes a soft cushion 9, and the soft cushions 9 are arranged on clamping surfaces of the clamping arms 3.

Figure 3:
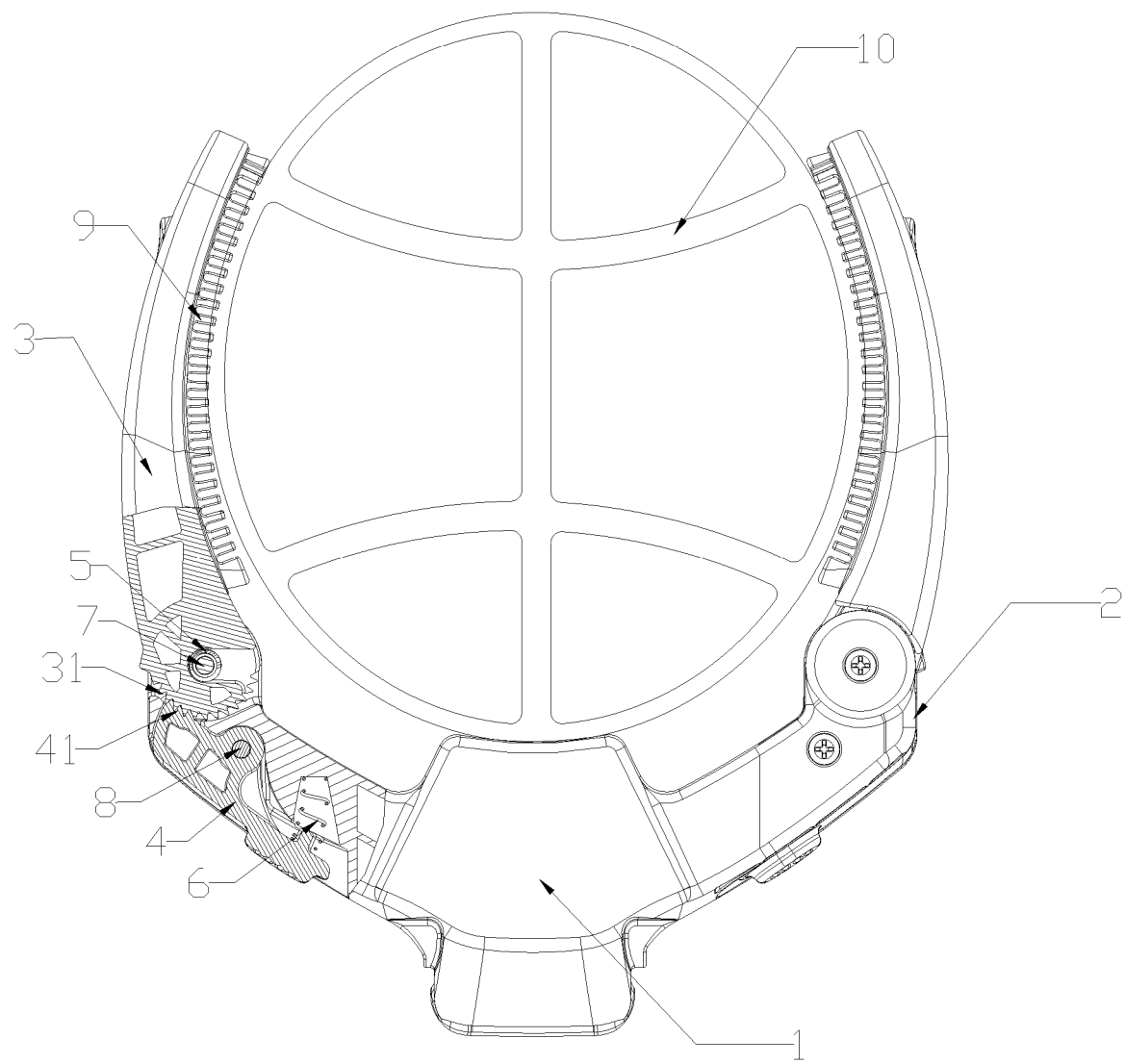
FIG. 3 is a partial sectional view of the golf bag fixing device, in a golf bag clamping state, for a golf cart of the invention.
Figure 4:
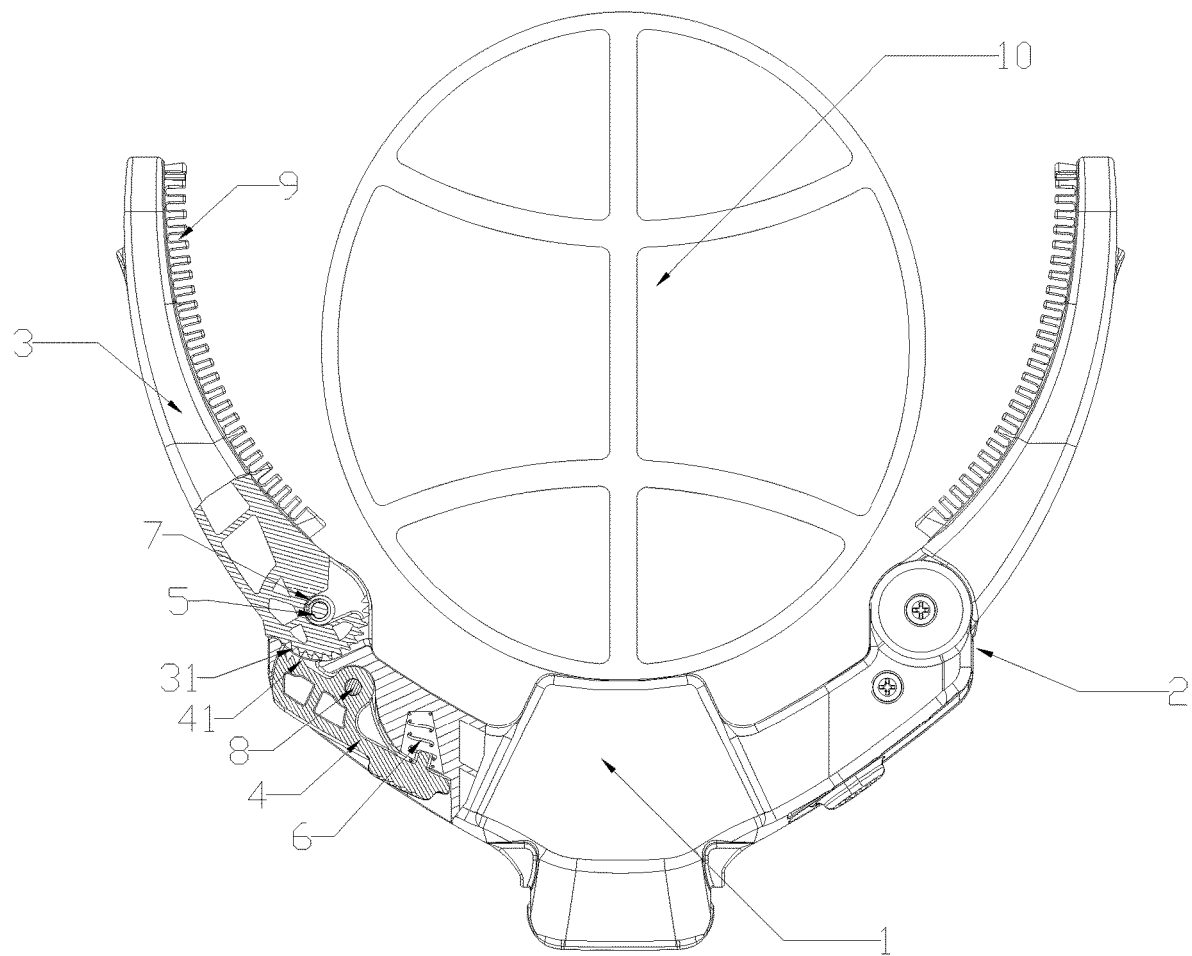
FIG. 4 is a partial sectional view of the golf bag fixing device, in a golf bag releasing state, for a golf cart of the invention.
Figure 5:
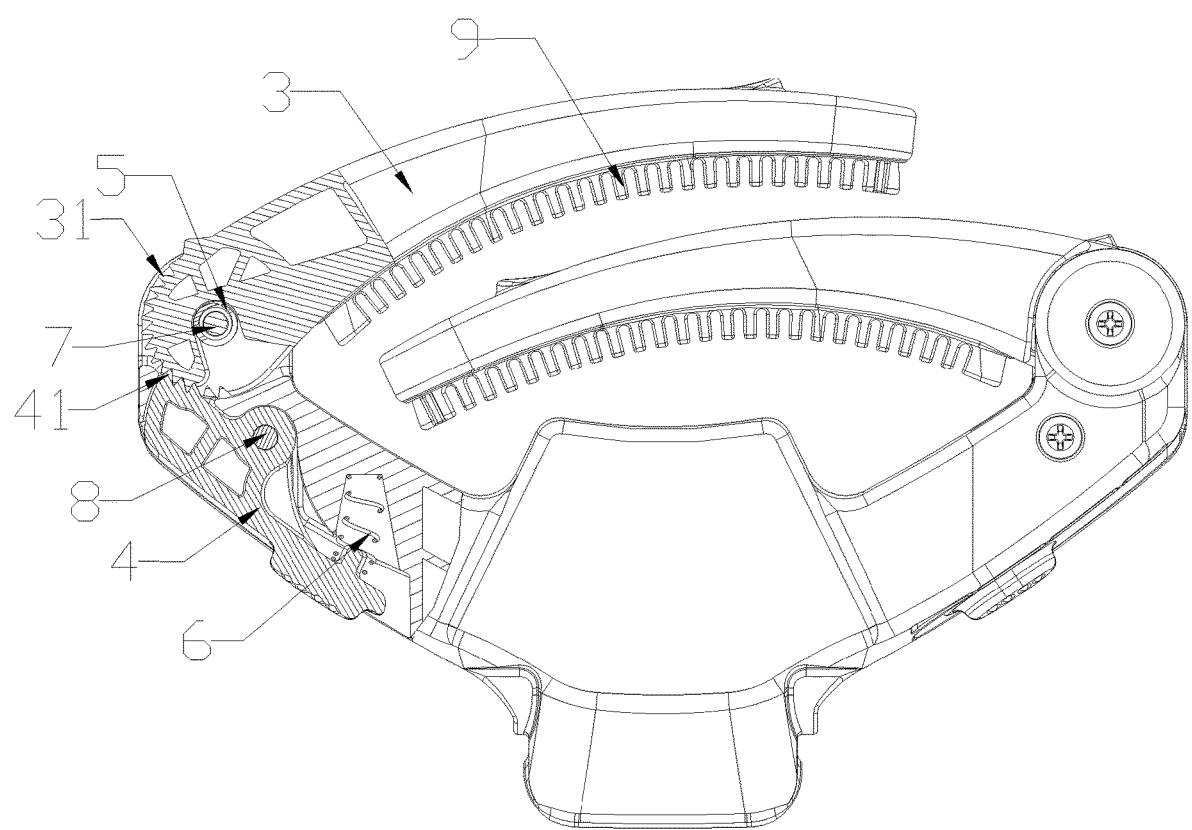
FIG. 5 is a partial sectional view of the golf bag fixing device, in a folded state, for a golf cart of the invention.

The working principle of the golf bag fixing device for a golf cart of the embodiment is as follows: as shown in FIG. 3, when transported, a golf bag 10 is placed into the clamping space formed between the base 1 and the clamping arms 3 of the two fixing assemblies 2, the clamping arms 3 of the two fixing assemblies 2 are rotated close to each other to clamp and fix the golf bag 10, in the rotation process of the clamping arms 3, the first tooth ripples 31 move along the second tooth ripples 41, and the first elastic mechanisms 5 are compressed; as shown in FIG. 4, when the golf bag 10 needs to be taken out, one ends of the fixing buckles 4 are pressed, the second elastic mechanisms 6 are compressed, one ends of the fixing buckles 4 tilt upwards, the second tooth ripples 41 and the first tooth ripples 31 are separated, and the first elastic mechanisms 5 are restored to push the clamping arms 3 away from each other, so that the golf bag 10 is no longer fixed by the two fixing assemblies 2 and then can be taken out; and the operation process is simple, usage is convenient, and when not used, the clamping arms 3 of the two fixing assemblies 2 can be folded to reduce the size, and thus, storage is facilitated, as shown in FIG. 5.

What is claimed is:

1. A golf bag fixing device for a golf cart, comprising a base and two fixing assemblies arranged at a left end and a right end of the base, wherein each said fixing assembly comprises a clamping arm and a fixing buckle, the clamping arms are rotatably arranged on the base and are connected with the fixing buckles, a clamping space is formed between the base and the clamping arms of the two fixing assemblies, the clamping arms are stressed to overcome an acting force from the fixing buckles to rotate relative to the base, and the fixing buckles are stressed to be separated from the clamping arms.

2. The golf bag fixing device for a golf cart according to claim 1, wherein first tooth ripples are formed on the clamping arms, a mounting cavity is formed in the base, the fixing buckles are located in the mounting cavity, second tooth ripples are formed at one ends of the fixing buckles, the first tooth ripples are engaged with the second tooth ripples, and the first tooth ripples are able to unidirectionally rotate relative to the second tooth ripples.

3. The golf bag fixing device for a golf cart according to claim 1, wherein each said fixing assembly further comprises a soft cushion, and the soft cushions are arranged on clamping surfaces of the clamping arms.

4. The golf bag fixing device for a golf cart according to claim 1, wherein each said fixing assembly further comprises a first elastic mechanism and a second elastic mechanism, the clamping arms are connected with the base through the first elastic mechanisms, the fixing buckles are rotatably arranged on the base, and the fixing buckles have one ends connected with the base through the second elastic mechanisms.

5. The golf bag fixing device for a golf cart according to claim 4, wherein the clamping arms are mounted on the base through first hinge pins, each said first elastic mechanism comprises a first spring, the first springs are arranged on the first hinge pins in a sleeving manner, and the first springs have one ends connected with the clamping arms and one ends connected with the base.

6. The golf bag fixing device for a golf cart according to claim 5, wherein first tooth ripples are formed on the clamping arms, a mounting cavity is formed in the base, the fixing buckles are located in the mounting cavity, second tooth ripples are formed at one ends of the fixing buckles, the first tooth ripples are engaged with the second tooth ripples, and the first tooth ripples are able to unidirectionally rotate relative to the second tooth ripples.

7. The golf bag fixing device for a golf cart according to claim 5, wherein each said fixing assembly further comprises a soft cushion, and the soft cushions are arranged on clamping surfaces of the clamping arms.

8. The golf bag fixing device for a golf cart according to claim 4, wherein the fixing buckles are mounted on the base through second hinge pins, each said second elastic mechanism comprises a second spring, and the second springs have one ends connected with one ends of the fixing buckles and one ends connected with the base.

9. The golf bag fixing device for a golf cart according to claim 8, wherein first tooth ripples are formed on the clamping arms, a mounting cavity is formed in the base, the fixing buckles are located in the mounting cavity, second tooth ripples are formed at one ends of the fixing buckles, the first tooth ripples are engaged with the second tooth ripples, and the first tooth ripples are able to unidirectionally rotate relative to the second tooth ripples.

10. The golf bag fixing device for a golf cart according to claim 8, wherein each said fixing assembly further comprises a soft cushion, and the soft cushions are arranged on clamping surfaces of the clamping arms.

11. The golf bag fixing device for a golf cart according to claim 4, wherein first tooth ripples are formed on the clamping arms, a mounting cavity is formed in the base, the fixing buckles are located in the mounting cavity, second tooth ripples are formed at one ends of the fixing buckles, the first tooth ripples are engaged with the second tooth ripples, and the first tooth ripples are able to unidirectionally rotate relative to the second tooth ripples.

12. The golf bag fixing device for a golf cart according to claim 4, wherein each said fixing assembly further comprises a soft cushion, and the soft cushions are arranged on clamping surfaces of the clamping arms.

* * * * *